United States Patent
Wang (10) Patent No.: US 10,432,714 B2
(45) Date of Patent: Oct. 1, 2019

(54) DATA PROCESSING METHOD AND SYSTEM BASED ON ASYMMETRIC P2P NETWORK

(71) Applicant: TENCENT TECHNOLOGY (SHENZHEN) COMPANY LIMITED, Shenzhen (CN)

(72) Inventor: Zhihua Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 394 days.

(21) Appl. No.: 15/113,480

(22) PCT Filed: Jun. 24, 2015

(86) PCT No.: PCT/CN2015/082253
§ 371 (c)(1),
(2) Date: Jul. 22, 2016

(87) PCT Pub. No.: WO2015/197001
PCT Pub. Date: Dec. 30, 2015

(65) Prior Publication Data
US 2017/0013056 A1    Jan. 12, 2017

(30) Foreign Application Priority Data
Jun. 25, 2014    (CN) .......................... 2014 1 0294453

(51) Int. Cl.
*H04L 29/08*    (2006.01)
*H04W 4/18*    (2009.01)
*H04L 29/06*    (2006.01)

(52) U.S. Cl.
CPC ...... *H04L 67/1074* (2013.01); *H04L 67/1063* (2013.01); *H04L 67/2842* (2013.01);
(Continued)

(58) Field of Classification Search
CPC ............. H04L 67/1063; H04L 67/1074; H04L 67/2842; H04L 67/2861; H04L 67/42;
(Continued)

(56) References Cited

U.S. PATENT DOCUMENTS

2004/0264471 A1    12/2004    Boulay et al.
2005/0203851 A1*    9/2005    King ................. G06F 17/30067
                                                                                705/51
(Continued)

FOREIGN PATENT DOCUMENTS

CN    102111426 A    6/2011
CN    102137147 A    7/2011
(Continued)

OTHER PUBLICATIONS

The World Intellectual Property Organization (WIPO), International Search Report for PCT/CN2015/082253, dated Sep. 23, 2015, p. 1-3.
(Continued)

*Primary Examiner* — Christopher Biagini
(74) *Attorney, Agent, or Firm* — Anova Law Group, PLLC (57)    ABSTRACT

A data processing method and system based on an asymmetric P2P network are described. The system includes: a data server, configured to store a to-be-downloaded resource; a computer terminal group, including at least one computer terminal, configured to download the to-be-downloaded resource from the data server and/or another computer terminal in the computer terminal group; and a mobile terminal group, including at least one mobile terminal, the mobile terminal establishing a communication relationship with the data server and the computer terminal, and being configured to download the to-be-downloaded resource from the data server and/or the computer terminal, any two
(Continued)

mobile terminals in the mobile terminal group being incapable of downloading the to-be-downloaded resource from each other, and the computer terminal in the computer terminal group being also incapable of downloading the to-be-downloaded resource from any mobile terminal.

12 Claims, 3 Drawing Sheets

(52) U.S. Cl.
CPC ........... *H04L 67/2861* (2013.01); *H04W 4/18* (2013.01); *H04L 67/42* (2013.01)

(58) Field of Classification Search
CPC ... H04L 2209/60; H04L 63/061; H04L 67/06; H04L 67/104; H04L 67/108; H04L 67/1085; H04L 67/1097; H04L 67/32; H04W 4/18; G06F 16/178; G06F 16/27; H04N 21/632
See application file for complete search history.

(56) References Cited

U.S. PATENT DOCUMENTS

| | | | | |
|---|---|---|---|---|
| 2009/0182815 | A1* | 7/2009 | Czechowski | H04L 67/104 709/206 |
| 2010/0235581 | A1* | 9/2010 | Anderson | G06F 12/0813 711/130 |
| 2011/0041161 | A1* | 2/2011 | Capati | G06F 21/10 726/4 |
| 2011/0231092 | A1* | 9/2011 | Kuo | G01S 5/16 701/532 |
| 2011/0238821 | A1* | 9/2011 | Matsuo | H04L 43/0876 709/224 |
| 2012/0047232 | A1 | 2/2012 | Hu et al. | |
| 2012/0054818 | A1* | 3/2012 | Noh | H04N 21/222 725/143 |

FOREIGN PATENT DOCUMENTS

| | | |
|---|---|---|
| CN | 102185920 A | 9/2011 |
| CN | 102195999 A | 9/2011 |
| CN | 103297447 A | 9/2013 |
| CN | 103379157 A | 10/2013 |

OTHER PUBLICATIONS

The State Intellectual Property Office of the People's Republic of China (SIPO), Office Action 1 for 201410294453.X, dated Sep. 20, 2017, 6 Pages. (including translation).

\* cited by examiner

DATA PROCESSING METHOD AND SYSTEM BASED ON ASYMMETRIC P2P NETWORK

CROSS-REFERENCE TO RELATED APPLICATION

This application claims priority to PCT Application No. PCT/CN2015/082253, filed on Jun. 24, 2015, which claims priority to Chinese Patent Application No. 201410294453.X, filed on Jun. 25, 2014, all of which is hereby incorporated by reference in their entirety.

FIELD OF THE TECHNOLOGY

The present disclosure relates to the field of computer Internet, and in particular, to a data processing method and system based on an asymmetric P2P network.

BACKGROUND OF THE DISCLOSURE

A most important characteristic of Internet is global interconnectivity. A traditional centralized service manner based on a server refers to a manner in which data is directly copied from the server to a client. This transmission manner is limited by a bandwidth condition, and a major problem is that a resource cannot be fully used. Because bandwidth of the server is shared by multiple clients, bandwidth of each client is usually not used completely when the client downloads data.

To solve the foregoing problem, the existing technology provides a peer-to-peer (P2P) technology. Different from an application technology based on a server, this technology is a new network communications technology that develops based on a P2P topological structure. In terms of level classification, the P2P belongs to a network application layer technology. This technology is mainly characterized by that functions of a server already seriously degenerates, and generally, the server is merely used as an index server that may mainly provide a search indexing service of various file lists on a network for all node peers on the network. On a P2P network, all resources are shared according to a rule, and any peer can join a P2P network group anytime and anywhere. The P2P technology is applicable to multiple application scenarios such as instant messaging, video sharing, and online game.

Specifically, P2P software may divide a file into blocks, and a sequence of downloading the blocks does not need to be fixed as long as the entire file can be finally downloaded completely. In a downloading process, a local client also shares, while other clients transmit data to the local client, a part downloaded by the local client. A data sharing process based on a P2P network includes two parts, namely, uploading and downloading. Uploading refers to that any node on a P2P network also shares a downloaded local resource with other nodes while downloading resources at the other nodes. A node consumes a large number of local network resources and hardware resources in an uploading/downloading process.

An online live video on-demand product on a windows platform is used as an example, and Tencent video, iQiyi, and the like all generally use a P2P network transmission technology. In a general case, a used technical solution combines http server downloading and P2P downloading. Some products such as Qvod also use pure P2P downloading. It should be noted herein that if a node on a P2P network is a mobile terminal, after a mobile terminal device uses the P2P solution, each device not only performs P2P downloading, but also performs P2P uploading. Because both an electricity amount and network resources (sensitive to network traffic) of a mobile device are limited, electricity amount and network resource consumption is accelerated when a mobile terminal provides P2P uploading, which affects other local functions of the mobile terminal, and causes the mobile terminal to crash and terminate work if it is serious.

With regard to the problem in the existing technology that because resources of a mobile terminal are limited, data uploading by the mobile terminal on a P2P network reduces the working efficiency of the mobile terminal, currently, no effective solution has been proposed yet.

SUMMARY

Embodiments of the present invention provide a data processing method and system based on an asymmetric P2P network, to solve at least a technical problem in the existing technology that because resources of a mobile terminal are limited, data uploading by the mobile terminal on a P2P network reduces the working efficiency of the mobile terminal.

According to an aspect of the embodiments of the present invention, a data processing system based on an asymmetric P2P network is provided. The system includes: a data server, configured to store a to-be-downloaded resource; a computer terminal group, including at least one computer terminal, the computer terminal establishing a communication relationship with the data server, and being configured to download the to-be-downloaded resource from the data server and/or another computer terminal in the computer terminal group; and a mobile terminal group, including at least one mobile terminal, the mobile terminal establishing a communication relationship with the data server and the computer terminal, and being configured to download the to-be-downloaded resource from the data server and/or the computer terminal, any two mobile terminals in the mobile terminal group being incapable of downloading the to-be-downloaded resource from each other, and the computer terminal in the computer terminal group being also incapable of downloading the to-be-downloaded resource from any mobile terminal.

According to another aspect of the embodiments of the present invention, a data processing method based on an asymmetric P2P network is further provided. The method includes: establishing, by any computer terminal in a computer terminal group, a communication relationship with a data server, and downloading a to-be-downloaded resource from the data server and/or another computer terminal in the computer terminal group; and downloading, by any mobile terminal in a mobile terminal group, the to-be-downloaded resource from the data server and/or the computer terminal in the computer terminal group, any two mobile terminals in the mobile terminal group being incapable of downloading the to-be-downloaded resource from each other, the computer terminal in the computer terminal group being also incapable of downloading the to-be-downloaded resource from any mobile terminal, and the data server being configured to store the to-be-downloaded resource.

The embodiments of the present invention use a data server, configured to store a to-be-downloaded resource; a computer terminal group, including at least one computer terminal, the computer terminal establishing a communication relationship with the data server, and being configured to download the to-be-downloaded resource from the data server and/or another computer terminal in the computer terminal group; and a mobile terminal group, including at least one mobile terminal, the mobile terminal establishing a communication relationship with the data server and the computer terminal, and being configured to download the to-be-downloaded resource from the data server and/or the computer terminal. Any two mobile terminals in the mobile terminal group are incapable of downloading the to-be-downloaded resource from each other, and the computer terminal in the computer terminal group is also incapable of downloading the to-be-downloaded resource from any mobile terminal. This manner provides a solution in which on an asymmetric P2P network, a computer terminal can provide an uploading function, but a mobile terminal is prohibited from providing the uploading function. Both the computer terminal and the mobile terminal can download the to-be-downloaded resource from the data server, but the mobile terminal is prohibited from performing uploading; therefore, another computer terminal cannot download to-be-downloaded data from the mobile terminal, and each mobile terminal cannot download corresponding to-be-downloaded data from a peer node. It is easily noted that a key point of the foregoing solution lies in that the mobile terminal is prohibited from uploading data, thereby preventing the mobile terminal from additionally consuming excessive local resources such as electrical energy and network resources. Therefore, a technical problem in the existing technology that because resources of a mobile terminal are limited, data uploading by the mobile terminal on a P2P network reduces the working efficiency of the mobile terminal is solved, an objective of saving a local resource of the mobile terminal is achieved, and the working efficiency of the mobile terminal is improved as much as possible when the mobile terminal downloads the to-be-downloaded data.

BRIEF DESCRIPTION OF THE DRAWINGS

The accompanying drawings described herein are intended to facilitate understanding of the present disclosure, and constitute a part of this application. Exemplary embodiments of the present invention and descriptions thereof are intended to explain the present disclosure, and do not constitute any improper limitation on the present disclosure. The accompanying drawings are as follows.

DESCRIPTION OF EMBODIMENTS

To make a person skilled in the art better understand the solutions of the present disclosure, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present disclosure.

It should be noted that terminologies such as "first", "second", and the like in this specification, claims, and the accompanying drawings of the present disclosure are used to distinguish similar objects, and are not used to describe a specific sequence or order. It should be noted that data used in this manner is exchangeable in a proper case, so that the embodiments of the present invention described herein can be implemented in sequences in addition to the sequences illustrated or described herein. In addition, the terms "include", "have", or any variation thereof are intended to cover a non-exclusive inclusion. For example, a process, method, system, product, or device that includes a series of steps or units is not limited to the clearly listed steps or units; and instead, may further include a step or unit that is not clearly listed, or another step or unit that is intrinsic to the process, method, product, or device.

Embodiment 1

Figure 1:
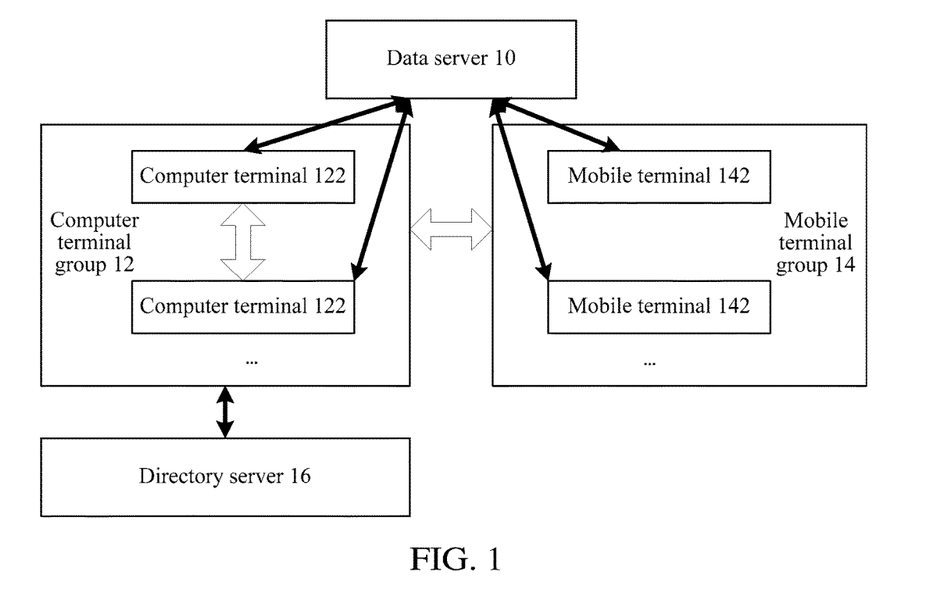
FIG. 1 is a schematic structural diagram of a data processing system based on an asymmetric P2P network according to Embodiment 1 of the present disclosure.

In a most fundamental configuration, FIG. 1 is a schematic structural diagram of a data processing system based on an asymmetric P2P network according to Embodiment 1 of the present disclosure. The illustrated architectural structure is for the purpose of description, and is merely an example of a suitable environment; and does not limit the use scope or function of this application. This computing system should also not be interpreted as relying on or need any component shown in FIG. 1 or a combination thereof.

As shown in FIG. 1, the data processing system based on an asymmetric P2P network may include: a data server 10, a computer terminal group 12, and a mobile terminal group 14.

The data server 10 is configured to store a to-be-downloaded resource; the computer terminal group 12 includes at least one computer terminal 122, the computer terminal establishing a communication relationship with the data server, and being configured to download the to-be-downloaded resource from the data server or another computer terminal in the computer terminal group; and the mobile terminal group 14 includes at least one mobile terminal 142, the mobile terminal establishing a communication relationship with the data server and the computer terminal, and being configured to download the to-be-downloaded resource from the data server or the computer terminal, any two mobile terminals in the mobile terminal group being incapable of downloading the to-be-downloaded resource from each other, and the computer terminal in the computer terminal group being also incapable of downloading the to-be-downloaded resource from any mobile terminal.

The system provided in Embodiment 1 of this application provides a solution in which on an asymmetric P2P network, a computer terminal can provide an uploading function, but a mobile terminal is prohibited from providing the uploading function. Both the computer terminal and the mobile terminal can download a to-be-downloaded resource from a data server, but the mobile terminal is prohibited from performing uploading; therefore, another computer terminal cannot download to-be-downloaded data from the mobile terminal, and each mobile terminal cannot download corresponding to-be-downloaded data from a peer node. It is easily noted that a key point of the foregoing solution lies in that the mobile terminal is prohibited from uploading data, thereby preventing the mobile terminal from additionally consuming excessive local resources such as electrical energy and network resources. Therefore, a technical problem in the existing technology that because resources of a mobile terminal are limited, data uploading by the mobile terminal on a P2P network reduces the working efficiency of the mobile terminal is solved, an objective of saving a local resource of the mobile terminal is achieved, and the working efficiency of the mobile terminal is improved as much as possible when the mobile terminal downloads the to-be-downloaded data.

Figure 2:
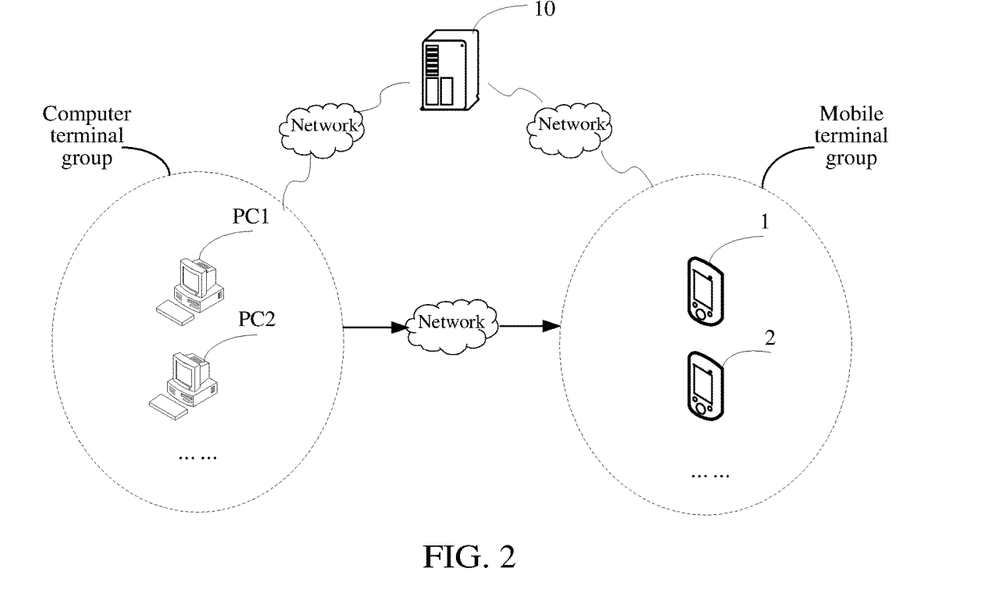
FIG. 2 is a detailed schematic structural diagram of the data processing system based on an asymmetric P2P network according to Embodiment 1 of the present disclosure.

It can be known with reference to FIG. 2 that the to-be-downloaded resource in the foregoing embodiment of this application may be video data. An example in which the to-be-downloaded resource is video data is used, and the data server 10 in the foregoing embodiment of this application may be a video server, where the video server is a server providing video downloading.

With reference to FIG. 2, the embodiment of this application shown in FIG. 1 is described in detail below by using an example in which the computer terminal group 12 includes two computer terminals, namely, PC1 and PC2, and the mobile terminal group 14 includes a mobile terminal 1 and a mobile terminal 2.

The computer terminals PC1 and PC2 may be personal computers having a video tool (for example, Tencent video) installed therein. In this embodiment, the computer terminals PC1 and PC2 may download video data from a video server and another computer terminal PC, and may also upload video data for another computer terminal PC and a mobile terminal device.

The mobile terminal 1 and the mobile terminal 2 may be mobile devices such as mobile phones and tablet computers also having video tools (for example, Tencent video) installed therein. The mobile terminal 1 and the mobile terminal 2 only download videos from a computer terminal PC and/or a video server on a P2P network, but do not provide a function of uploading video data.

As can be known, in the example provided in FIG. 2, on an asymmetric P2P network, a mobile terminal device has a function of providing only downloading but no uploading on the P2P network, a computer terminal PC may provide a function of both uploading and downloading, and the mobile terminal device intelligently acquires video data from the computer terminal and/or a video server.

Preferably, the system in the foregoing embodiment of this application may further include a directory server 16.

The directory server 16 establishes a communication relationship with the computer terminal group and the mobile terminal group, and is configured to: after a first computer terminal in the computer terminal group downloads the to-be-downloaded resource, record download information of the first computer terminal, the download information of the first computer terminal including: address information of the first computer terminal and identity information of the to-be-downloaded resource acquired by the first computer terminal.

The first computer terminal (for example, the computer terminal PC1 in FIG. 2) in the computer terminal group may download the to-be-downloaded resource (for example, video data) from the data server 10 (for example, the video server in FIG. 2) or another computer terminal (for example, the computer terminal PC2 in FIG. 2). After the first computer terminal downloads to-be-downloaded data, the first computer terminal sends the generated download information to the directory server 16 for saving.

As can be known, the directory server 16 herein provides a global central index server, and may manage node information of all nodes (computer terminals and mobile terminals) on a P2P network. For example, as shown in FIG. 2, after the computer terminal PC1 downloads the to-be-downloaded data, the computer terminal PC1 sends the generated download information to the directory server 16 for saving. In this case, the download information may be saved in a form of a data table, and includes at least the following data fields: address information of the computer terminal PC1 and identity information of video data currently downloaded by the computer terminal PC1, where the identity information may be data such as a name or coding of a video. The identity information of the video data is data used by another computer terminal or mobile terminal to perform a match operation during video downloading, and the address information is used in such a way that after the identity information of the video data is successfully matched, corresponding address information may be used to access a corresponding computer terminal to download corresponding video data.

Download information saved in the directory server is shown in table 1 as follows:

TABLE 1

| | Identity Information of Video Data | Address Information | ... |
|---|---|---|---|
| Computer Terminal PC1 | Film of Coming Home | http://abc1/cn/123 | |
| Computer Terminal PC2 | Animation of Boonie Bears | http://abc1/cn/1234/123 | |
| ... | ... | ... | |

In an optional embodiment provided in this application, the directory server 16 is further configured to: after receiving a download request sent by any one or more mobile terminals in the mobile terminal group, return address information of a computer terminal corresponding to the download request, where any one or more mobile terminals access the computer terminal according to the address information of the computer terminal, and download the to-be-downloaded resource from the computer terminal; and the download request includes identity information of the to-be-downloaded resource.

The embodiment shown in FIG. 2 is still used as an example. After the mobile terminal 1 in the mobile terminal group sends a download request, a query operation is performed on the directory server 16 according to a name (for example, the film of Coming Home), carried in the download request, of video data expected to be downloaded, to find, in the directory server 16, address information (for example, http://abc1/cn/123) of a computer terminal corresponding to the name of the video data. Because the computer terminal PC1 already downloads the video data, the mobile terminal can download the corresponding video data (for example, the film of Coming Home) from the computer terminal PC1 according to the address information (for example, http://abc1/cn/123).

Preferably, in the foregoing optional embodiment, in a case in which any one or more mobile terminals cannot successfully acquire the address information of the computer terminal corresponding to the download request, any one or more mobile terminals forward the download request to the data server, and download the to-be-downloaded resource from the data server. In this case, the mobile terminal fails to find the address information of the corresponding computer terminal from the directory server, and switches to acquire the corresponding to-be-downloaded resource from the data server.

It can be known from the foregoing that in the embodiment provided in this application, in a process in which the mobile terminal 1 or 2 downloads video data from the video server and another computer terminal PC, the video data is preferentially downloaded from the another computer terminal PC (for example, the computer terminal PC1 and/or PC2), the video server is accessed to acquire the video data only after the computer terminal PC cannot provide the corresponding video data, thereby saving an access resource of the video server, as can be known from the example shown in FIG. 2.

It should be emphasized herein that in the optional embodiment of this application, after any one or more mobile terminals acquire the to-be-downloaded resource, download information of the mobile terminal is prohibited from being uploaded to the directory server, where the download information of the mobile terminal includes: address information of the mobile terminal downloading the to-be-downloaded resource, and identity information of the to-be-downloaded resource acquired by the mobile terminal.

In the foregoing process, a mobile terminal does not provide a function of uploading video data, and only a computer terminal provides the function of uploading video data, so that any computer terminal PC and mobile terminal cannot download video data from the current mobile terminal. As can be known, a key point of this application lies in that after a mobile terminal downloads video data, the mobile terminal does not upload download information to a directory server, so that neither a computer terminal nor another mobile terminal can find, in the directory server, the mobile terminal saving the video data, thereby prohibiting video data from being acquired from any mobile terminal.

Preferably, the data processing system of this application may further include a configuration server, where the configuration server may save a control parameter, and the control parameter may be represented by setting a control variable to 0 or 1.

The configuration server establishes a communication relationship with the mobile terminal, and is configured to provide a control parameter for the mobile terminal, where after any one or more mobile terminals acquire the to-be-downloaded resource, whether to prohibit the download information of the mobile terminal from being uploaded to the directory server is determined by acquiring the control parameter.

After the configuration server provides the control parameter, when the mobile terminal acquires the to-be-downloaded resource, the mobile terminal may first access the configuration server to read a set control parameter from the configuration server. If the control parameter is set to a variable indicating uploading prohibition (that is, the control variable is set to 0), the mobile terminal is prohibited from uploading the download information of the mobile terminal to the directory server, so that another terminal cannot acquire the download information of the mobile terminal when accessing the directory server, thereby prohibiting the another terminal from downloading video data from the mobile terminal.

It should be noted herein that it may be system default that the control parameter of the configuration server is the variable indicating uploading prohibition; and to improve system flexibility, the mobile terminal may also be enabled to provide the uploading function by modifying the control parameter of the configuration server (where the control parameter may be set to 1).

In addition, to save a resource, in this application, the control parameter may be further locally embedded in the mobile terminal in advance. When the mobile terminal acquires the to-be-downloaded resource, the mobile terminal automatically reads the control parameter set locally in advance. If the control parameter is set to the variable indicating uploading prohibition (that is, the control variable is set to 0), it is controlled that the mobile terminal is prohibited from uploading the download information of the mobile terminal to the directory server; otherwise, the uploading function is provided.

In another optional embodiment provided in this application, the directory server is further configured to: after receiving a download request sent by a second computer terminal in the computer terminal group, return, to the second computer terminal, address information of a computer terminal corresponding to the download request, where the second computer terminal accesses the computer terminal according to the address information of the computer terminal, and downloads the to-be-downloaded resource from the computer terminal; and the download request includes identity information of the to-be-downloaded resource.

The embodiment shown in FIG. 2 is still used as an example. The second computer terminal in the foregoing embodiment may be the computer terminal PC2. After the computer terminal PC2 in the computer terminal group sends a download request, a query operation is performed on the directory server 16 according to a name (for example, the film of Coming Home), carried in the download request, of video data expected to be downloaded, to find, in the directory server 16, address information (for example, http://abc1/cn/123) of a computer terminal corresponding to the name of the video data. Because the computer terminal PC1 already downloads the video data, the computer terminal PC2 can download the corresponding video data (for example, the film of Coming Home) from the computer terminal PC1 according to the address information (for example, http://abc1/cn/123).

Preferably, in the another optional embodiment provided in this application, in a case in which the second computer terminal cannot successfully acquire the address information of the computer terminal corresponding to the download request, the second computer terminal forwards the download request to the data server, and downloads the to-be-downloaded resource from the data server. In this case, the second computer terminal fails to find the address information of the corresponding computer terminal from the directory server, and switches to acquire the corresponding to-be-downloaded resource from the data server. In this case, the second computer terminal may be the computer terminal PC2 in FIG. 2.

It can be known from the foregoing that in the embodiment provided in this application, in a process in which the computer terminal PC2 downloads video data from the video server and another computer terminal PC, the video data is preferentially downloaded from the another computer terminal PC (for example, the computer terminal PC1), the video server is accessed to acquire the video data only after the computer terminal PC1 cannot provide the corresponding video data, thereby saving an access resource of the video server, as can be known from the example shown in FIG. 2.

In this case, the computer terminal PC2 successfully downloading video data uploads download information to the directory server, so that another computer terminal and mobile terminal may also download corresponding video data from the computer terminal PC2. As can be known, in this application, the computer terminal PC in the computer terminal group provides a function of uploading video data, so that another computer terminal PC and mobile terminal may download video data from the current computer terminal PC.

Figure 3:
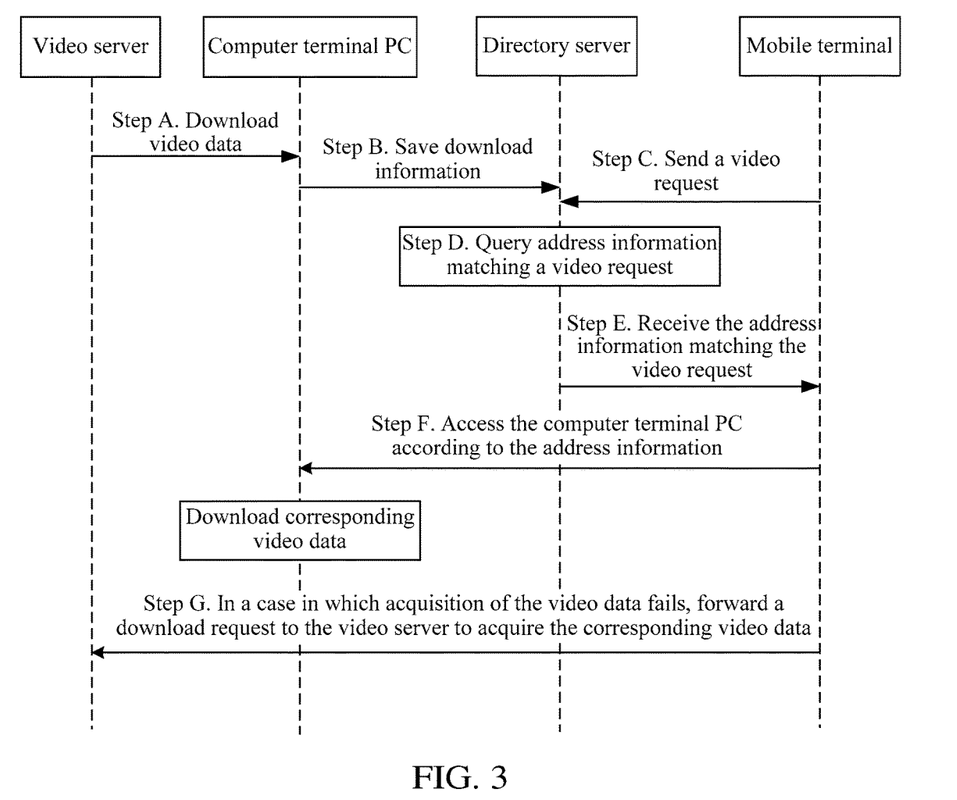
FIG. 3 is a schematic flowchart of an optional implementation manner of the data processing system based on an asymmetric P2P network according to Embodiment 1 of the present disclosure.

Based on FIG. 2, with reference to the flowchart shown in FIG. 3, and by using an example in which the mobile terminal 1 downloads video data, the foregoing embodiment of this application is described in detail as follows:

Step A: A computer terminal PC downloads video data from a video server and/or another computer terminal.

Step B: After the computer terminal PC successfully downloads the video data, save, to a directory server, download information formed by address information of the computer terminal PC and identity information of the video data such as a name of a video: the animation of Boonie Bears.

Step C: A mobile terminal sends a video request, where the video request includes the identity information of the video data.

Step D: After the directory server receives the video request of the mobile terminal, the directory server queries address information matching the identity information of the video data carried in the video request, where the address information is a link address of the computer terminal PC already successfully downloading the video data.

Step E: The mobile terminal receives the address information that is returned by the directory server and matches the identity information of the video data carried in the video request.

Step F: The mobile terminal accesses the computer terminal PC according to the found address information, and downloads the corresponding video data. In this case, the mobile terminal is prohibited from uploading the download information to the directory server, where the download information includes at least address information of the mobile terminal and the identity information of the video data.

Step G: In a case in which the mobile terminal finds no matched address information from the directory server, or the video data fails to be returned to the mobile terminal, the mobile terminal forwards a download request to the video server to acquire the corresponding video data.

In the foregoing embodiment, the mobile terminal may be any mobile device in the mobile terminal group, and the computer terminal PC may be any PC device in the computer terminal group.

Embodiment 2

Figure 4:
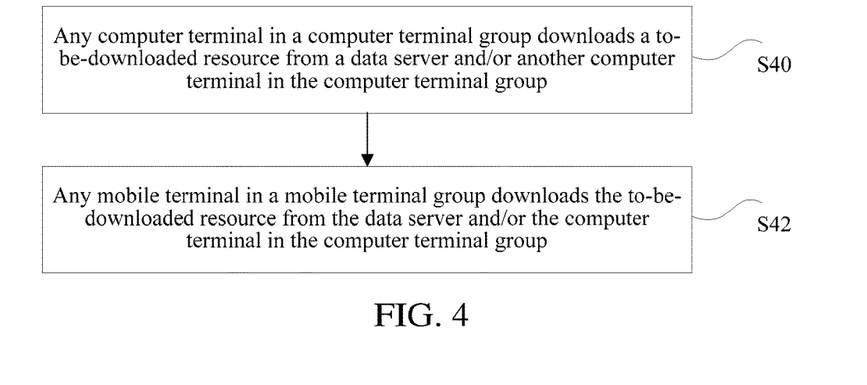
FIG. 4 is a schematic flowchart of a data processing method based on an asymmetric P2P network according to Embodiment 2 of the present disclosure.

According to this embodiment of the present invention, a method embodiment for implementing the foregoing system embodiment is further provided. FIG. 4 is a schematic flowchart of a data processing method based on an asymmetric P2P network according to Embodiment 2 of the present disclosure.

As shown in FIG. 4, the data processing method based on an asymmetric P2P network may include the following steps:

Step S40: Any computer terminal in a computer terminal group establishes a communication relationship with a data server, and downloads a to-be-downloaded resource from a data server and/or another computer terminal in the computer terminal group.

Step S42: Any mobile terminal in a mobile terminal group downloads the to-be-downloaded resource from the data server and/or the computer terminal in the computer terminal group.

Any two mobile terminals in the mobile terminal group are incapable of downloading the to-be-downloaded resource from each other, the computer terminal in the computer terminal group is also incapable of downloading the to-be-downloaded resource from any mobile terminal, and the data server is configured to store the to-be-downloaded resource.

The method embodiment provided in Embodiment 2 of this application provides a solution in which on an asymmetric P2P network, a computer terminal can provide an uploading function, but a mobile terminal is prohibited from providing the uploading function. Both the computer terminal and the mobile terminal can download a to-be-downloaded resource from a data server, but the mobile terminal is prohibited from performing uploading; therefore, another computer terminal cannot download to-be-downloaded data from the mobile terminal, and each mobile terminal cannot download corresponding to-be-downloaded data from a peer node. It is easily noted that a key point of the foregoing solution lies in that the mobile terminal is prohibited from uploading data, thereby preventing the mobile terminal from additionally consuming excessive local resources such as electrical energy and network resources. Therefore, a technical problem in the existing technology that because resources of a mobile terminal are limited, data uploading by the mobile terminal on a P2P network reduces the working efficiency of the mobile terminal is solved, an objective of saving a local resource of the mobile terminal is achieved, and the working efficiency of the mobile terminal is improved as much as possible when the mobile terminal downloads the to-be-downloaded data.

It should be noted herein that the to-be-downloaded resource in the foregoing embodiment of this application may be video data. An example in which the to-be-downloaded resource is video data is used, and the data server in the foregoing embodiment of this application may be a video server, where the video server is a server providing video downloading.

The method embodiment of this application shown in FIG. 4 is described in detail below by using an example in which the computer terminal group includes two computer terminals, namely, PC1 and PC2, and the mobile terminal group includes a mobile terminal 4 and a mobile terminal 2.

The computer terminals PC1 and PC2 may be personal computers having a video tool (for example, Tencent video) installed therein. In this embodiment, the computer terminals PC1 and PC2 may download video data from a video server and another computer terminal PC, and may also upload video data for another computer terminal PC and a mobile terminal device.

The mobile terminal 1 and the mobile terminal 2 may be mobile devices such as mobile phones and tablet computers also having video tools (for example, Tencent video) installed therein. The mobile terminal 1 and the mobile terminal 2 only download videos from a computer terminal PC and/or a video server on a P2P network, but do not provide a function of uploading video data.

As can be known, on an asymmetric P2P network, a mobile terminal device has a function of providing only downloading but no uploading on the P2P network, a computer terminal PC may provide a function of both uploading and downloading, and the mobile terminal device intelligently acquires video data from the computer terminal and/or a video server.

Preferably, in the foregoing embodiment of this application, before step S42 is performed, that is, before performing the downloading, by any mobile terminal in a mobile terminal group, the to-be-downloaded resource from the data server and/or the computer terminal in the computer terminal group, the following step may be further performed.

Step S411: A first computer terminal in the computer terminal group downloads the to-be-downloaded resource.

The first computer terminal in the computer terminal group in this step may be the computer terminal PC1 in FIG. 2, and the computer terminal PC1 may download the video data from the video server in FIG. 2 or the computer terminal PC2 in FIG. 2.

Step S413: Upload download information of the first computer terminal to a directory server, where the download information of the first computer terminal includes: address information of the first computer terminal and identity information of the to-be-downloaded resource acquired by the first computer terminal.

In step S413, after the first computer terminal downloads to-be-downloaded data, the first computer terminal sends the generated download information to the directory server for saving. In this case, the download information may be saved in a form of a data table, and includes at least the following data fields: address information of the computer terminal PC1 and identity information of video data currently downloaded by the computer terminal PC1, where the identity information may be data such as a name or coding of a video. The identity information of the video data is data used by another computer terminal or mobile terminal to perform a match operation during video downloading, and the address information is used in such a way that after the identity information of the video data is successfully matched, corresponding address information may be used to access a corresponding computer terminal to download corresponding video data.

As can be known, the directory server herein provides a global central index server, and may manage node information of all nodes (computer terminals and mobile terminals) on a P2P network.

In an optional embodiment provided in this application, the solution, implemented in step S42, of downloading, by any mobile terminal in a mobile terminal group, the to-be-downloaded resource from the data server and/or the computer terminal in the computer terminal group may be implemented by using the following steps:

Step S421: Any one or more mobile terminals in the mobile terminal group send a download request to the directory server, the download request in this step may carry a name (for example, the film of Coming Home) of video data that a user of the mobile terminal expects to download.

Step S423: Any one or more mobile terminals receive address information, returned by the directory server, of a computer terminal corresponding to the download request.

It can be known by means of analyzing that the directory server performs a query operation according to a name (for example, the film of Coming Home), carried in the download request, of video data expected to be downloaded, to find address information (for example, http://abc1/cn/123) of a computer terminal corresponding to the name of the video data; and returns the address information to the mobile terminal sending the download request.

Step S425: Any one or more mobile terminals access the computer terminal according to the address information of the computer terminal, and download the to-be-downloaded resource from the computer terminal, where the download request includes identity information of the to-be-downloaded resource. In this way, the mobile terminal can download the corresponding video data (for example, the film of Coming Home) from the computer terminal PC1 according to the address information (for example, http://abc1/cn/123).

Preferably, in the foregoing embodiment of this application, after the sending, by any one or more mobile terminals in the mobile terminal group, a download request to the directory server is performed in step S421, the following steps may be further performed.

Step S4211: Query, in the directory server, whether the address information of the computer terminal corresponding to the download request sent by any one or more mobile terminals is recorded.

Step S4212: Perform, in a case in which the query succeeds, a step of returning, to any one or more mobile terminals, the address information of the computer terminal corresponding to the download request.

Step S4213: The mobile terminal forwards the download request to the data server in a case in which the query fails, and downloads the to-be-downloaded resource from the data server.

In step S4211 to step S4213, in a case in which the mobile terminal fails to find the address information of the corresponding computer terminal from the directory server, the mobile terminal may switch to acquire the corresponding to-be-downloaded resource from the data server.

It can be known from the foregoing that in the embodiment provided in this application, in a process in which the mobile terminal downloads video data from the video server and another computer terminal PC, the video data is preferentially downloaded from the computer terminal PC, the video server is accessed to acquire the video data only after the computer terminal PC cannot provide the corresponding video data, thereby saving an access resource of the video server.

It should be emphasized herein that the key of the solution of this application lies in that after the mobile terminal downloads the to-be-downloaded resource, the mobile terminal is prohibited from uploading download information of the mobile terminal to the directory server, where the download information of the mobile terminal includes: address information of the mobile terminal downloading the to-be-downloaded resource, and identity information of the to-be-downloaded resource acquired by the mobile terminal.

Preferably, in the foregoing solution, by acquiring a control parameter provided by a configuration server, the mobile terminal may be triggered, based on the control parameter, to prohibit the download information of the mobile terminal from being uploaded to the directory server.

The configuration server in this embodiment may save the control parameter, and the control parameter may be represented by setting a control variable to 0 or 1. After the configuration server establishes a communication relationship with the mobile terminal, when the mobile terminal acquires the to-be-downloaded resource, the mobile terminal may first access the configuration server to read a set control parameter from the configuration server. If the control parameter is set to a variable indicating uploading prohibition (that is, the control variable is set to 0), the mobile terminal is prohibited from uploading the download information of the mobile terminal to the directory server, so that another terminal cannot acquire the download information of the mobile terminal when accessing the directory server, thereby prohibiting the another terminal from downloading video data from the mobile terminal.

It should be noted herein that it may be system default that the control parameter of the configuration server is the variable indicating uploading prohibition; and to improve system flexibility, the mobile terminal may also be enabled to provide the uploading function by modifying the control parameter of the configuration server (where the control parameter may be set to 1).

In addition, to save a resource, in this application, the control parameter may be further locally embedded in the mobile terminal in advance. When the mobile terminal acquires the to-be-downloaded resource, the mobile terminal automatically reads the control parameter set locally in advance. If the control parameter is set to the variable indicating uploading prohibition (that is, the control variable is set to 0), it is controlled that the mobile terminal is prohibited from uploading the download information of the mobile terminal to the directory server.

In the foregoing process, a mobile terminal does not provide a function of uploading video data, and only a computer terminal provides the function of uploading video data, so that any computer terminal PC and mobile terminal cannot download video data from the current mobile terminal. As can be known, a key point of this application lies in that after a mobile terminal downloads video data, the mobile terminal does not upload download information to a directory server, so that neither a computer terminal nor another mobile terminal can find, in the directory server, the mobile terminal saving the video data, thereby prohibiting video data from being acquired from any mobile terminal.

In another optional embodiment provided in this application, after the uploading download information of the first computer terminal to a directory server is performed in step S413, the following steps may be further performed.

Step S414: The directory server receives a download request sent by a second computer terminal in the computer terminal group. It should be noted herein that the second computer terminal in this step may be the computer terminal PC2 in FIG. 2.

Step S415: Return, to the second computer terminal, address information of a computer terminal corresponding to the download request.

It can be known by means of analyzing with reference to FIG. 2 that after the computer terminal PC2 in the computer terminal group sends the download request, the directory server may perform a query operation according to a name (for example, the film of Coming Home), carried in the download request, of video data expected to be downloaded, to find address information (for example, http://abc1/cn/123) of a computer terminal corresponding to the name of the video data.

Step S416: The second computer terminal accesses the computer terminal according to the address information of the computer terminal, and downloads the to-be-downloaded resource from the computer terminal, where the download request includes identity information of the to-be-downloaded resource. In this way, the computer terminal PC2 can download the corresponding video data (for example, the film of Coming Home) from the computer terminal PC1 according to the address information (for example, http://abc1/cn/123).

Preferably, after the receiving, by the directory server, a download request sent by a second computer terminal in the computer terminal group is performed in step S414, the following steps may be further performed.

Step S4141: Query, in the directory server, whether the address information of the computer terminal corresponding to the download request sent by the second computer terminal is recorded.

Step S4143: Perform, in a case in which the query succeeds, a step of returning, to the second computer terminal, the address information of the computer terminal corresponding to the download request.

Step S4145: The second computer terminal forwards the download request to the data server in a case in which the query fails, and downloads the to-be-downloaded resource from the data server.

In step S4141 to step S4145, in a case in which the second computer terminal fails to find the address information of the corresponding computer terminal from the directory server, the second computer terminal switches to acquire the corresponding to-be-downloaded resource from the data server.

It can be known from the foregoing that in the embodiment provided in this application, in a process in which the computer terminal PC2 downloads video data from the video server and another computer terminal PC, the video data is preferentially downloaded from the another computer terminal PC, the video server is accessed to acquire the video data only after the computer terminal PC cannot provide the corresponding video data, thereby saving an access resource of the video server.

It can be known from the foregoing that in this application, the mobile terminal in the mobile terminal group does not provide the uploading function, and the computer terminal PC in the computer terminal group provides the function of uploading video data, so that another computer terminal PC and mobile terminal may download video data from the current computer terminal PC.

It should be noted that for the purpose of brief description, the foregoing method embodiments are expressed as a series of action combinations. However, a person skilled in the art should know that the present disclosure is not limited to an action sequence described, because some steps may be performed in another sequence or simultaneously according to the present disclosure. In addition, a person skilled in the art should also know that all the embodiments described in this specification are exemplary embodiments, and actions and modules involved are not necessarily mandatory in the present disclosure.

Through the foregoing description of the embodiments, it is clear to a person skilled in the art that the method of the foregoing embodiments may be implemented by software plus a necessary universal hardware platform, and definitely may also be implemented by hardware, but in many cases, the software implementation is preferred. Based on such an understanding, the technical solutions of the present disclosure essentially or the part contributing to the existing technology may be implemented in a form of a software product. The computer software product is stored in a storage medium (for example, a ROM/RAM, a magnetic disk, or an optical disc) and includes several instructions for instructing a terminal device (which may be a mobile phone, a computer, a server, a network device, or the like) to perform the methods described in the embodiments of the present invention.

Embodiment 3

This embodiment of the present invention may provide a mobile terminal, and the mobile terminal may be any mobile device in a mobile terminal group. Optionally, in this embodiment, the mobile terminal may be a mobile phone, a tablet computer, or the like.

Optionally, in this embodiment, the mobile terminal may be at least one network device in multiple network devices located on an asymmetric P2P network.

In this embodiment, the mobile terminal may execute program code of the following step in a data processing method based on an asymmetric P2P network. The step includes: downloading a to-be-downloaded resource from a data server and/or a computer terminal in a computer terminal group, any two mobile terminals in the mobile terminal group being incapable of downloading the to-be-downloaded resource from each other, the computer terminal in the computer terminal group being also incapable of downloading the to-be-downloaded resource from any mobile terminal, and the data server being configured to store the to-be-downloaded resource.

It should be noted herein that any computer terminal in the computer terminal group establishes a communication relationship with the data server, and downloads a to-be-downloaded resource from the data server and/or another computer terminal in the computer terminal group.

Figure 5:
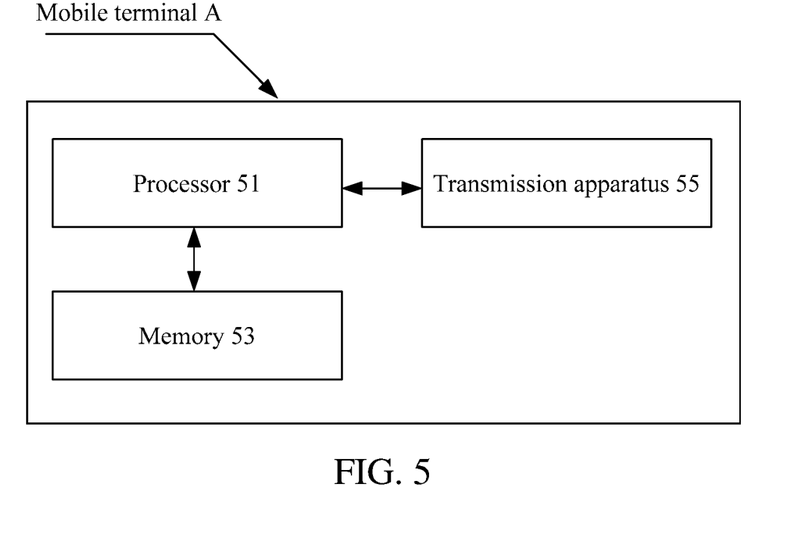
FIG. 5 is a structural block diagram of a mobile terminal according to an embodiment of the present invention.

Optionally, FIG. 5 is a structural block diagram of a mobile terminal according to an embodiment of the present invention. As shown in FIG. 5, a mobile terminal A may include: one or more processors 51 (only one processor is shown in FIG. 5), a memory 53, and a transmission apparatus 55.

The memory 53 may be configured to store a software program and module, for example, program instructions/modules corresponding to the data processing method and system based on an asymmetric P2P network in the embodiments of the present invention. The processor 51 runs the software program and module stored in the memory 53, to implement various functional application and data processing, that is, implement the data processing method based on an asymmetric P2P network. The memory 53 may include a high speed random access memory, and may also include a non-volatile memory such as one or more magnetic storage apparatuses, flash memories, or other non-volatile solid-state memories. In some embodiments, the memory 53 may further include memories remotely disposed relative to the processor 51, and these remote memories may be connected to the terminal A through a network. In an embodiment, the network includes, but is not limited to, the Internet, an intranet, a local area network, a mobile communications network, and a combination thereof.

The transmission apparatus 55 is configured to receive or send data through a network. In a specific embodiment, the network may include a wired network and a wireless network. In an embodiment, the transmission apparatus 55 includes a network adapter (Network Interface Controller, NIC), and may be connected to another network device and a router by using a network cable, to communicate with the Internet or a local area network. In an embodiment, the transmission apparatus 55 is a radio frequency (RF) module, and is configured to communicate with the Internet in a wireless manner.

Specifically, the memory 53 is configured to store information about a preset action condition and a preset authorized user, and an application program.

The processor 51 may invoke, by using the transmission apparatus, the information and application program stored in the memory 53, to perform the following step: downloading a to-be-downloaded resource from a data server and/or a computer terminal in a computer terminal group, any two mobile terminals in the mobile terminal group being incapable of downloading the to-be-downloaded resource from each other, the computer terminal in the computer terminal group being also incapable of downloading the to-be-downloaded resource from any mobile terminal, and the data server being configured to store the to-be-downloaded resource.

Optionally, the processor 51 may further execute program code of the following steps: sending, by any one or more mobile terminals in the mobile terminal group, a download request to a directory server; receiving, by any one or more mobile terminals, address information, returned by the directory server, of a computer terminal corresponding to the download request; and accessing, by any one or more mobile terminals, the computer terminal according to the address information of the computer terminal, and downloading the to-be-downloaded resource from the computer terminal, where the download request includes identity information of the to-be-downloaded resource.

Optionally, the processor 51 may further execute program code of the following step: in a case in which the mobile terminal fails to find the address information of the corresponding computer terminal from the directory server, switching to acquire the corresponding to-be-downloaded resource from the data server.

By using this embodiment of the present invention, a solution of prohibiting a mobile terminal from providing an uploading function on an asymmetric P2P network is provided. Both a computer terminal and a mobile terminal can download a to-be-downloaded resource from a data server, but the mobile terminal is prohibited from performing uploading; therefore, another computer terminal cannot download to-be-downloaded data from the mobile terminal, and each mobile terminal cannot download corresponding to-be-downloaded data from a peer node. It is easily noted that a key point of the foregoing solution lies in that the mobile terminal is prohibited from uploading data, thereby preventing the mobile terminal from additionally consuming excessive local resources such as electrical energy and network resources. Therefore, a technical problem in the existing technology that because resources of a mobile terminal are limited, data uploading by the mobile terminal on a P2P network reduces the working efficiency of the mobile terminal is solved, an objective of saving a local resource of the mobile terminal is achieved, and the working efficiency of the mobile terminal is improved as much as possible when the mobile terminal downloads the to-be-downloaded data.

A person of ordinary skill in the art may understand that the structure shown in FIG. 5 is merely exemplary, and the mobile terminal may be a terminal device such as a smart phone (for example, an Android mobile phone, an iOS mobile phone, or the like), a tablet computer, a palmtop computer, or a mobile Internet device (MID). FIG. 5 does not limit a structure of the electronic apparatus. For example, the terminal A may further include more components or fewer components (for example, a network interface, a display apparatus, and the like) than those shown in FIG. 5, or have a configuration different from that shown in FIG. 5.

A person of ordinary skill in the art may understand that all or a part of the steps of the methods in the embodiments may be implemented by a program instructing relevant hardware of a terminal device. The program may be stored in a computer readable storage medium. The storage medium may include: a flash memory, a read-only memory (ROM), a random access memory (RAM), a magnetic disk, or an optical disc.

Embodiment 4

This embodiment of the present invention further provides a storage medium. Optionally, in this embodiment, the storage medium may be configured to save program code executed by the data processing method based on an asymmetric P2P network provided in Embodiment 2.

Optionally, in this embodiment, the mobile terminal may be at least one network device in multiple network devices located on an asymmetric P2P network.

Optionally, in this embodiment, the storage medium is set to store program code for performing the following step: downloading a to-be-downloaded resource from a data server and/or a computer terminal in a computer terminal group, any two mobile terminals in the mobile terminal group being incapable of downloading the to-be-downloaded resource from each other, the computer terminal in the computer terminal group being also incapable of downloading the to-be-downloaded resource from any mobile terminal, and the data server being configured to store the to-be-downloaded resource.

It should be noted herein that any computer terminal in the computer terminal group establishes a communication relationship with the data server, and downloads a to-be-downloaded resource from the data server and/or another computer terminal in the computer terminal group.

Optionally, the storage medium is further set to store program code for performing the following steps: sending a download request to a directory server; receiving address information, returned by the directory server, of a computer terminal corresponding to the download request; and accessing, by any one or more mobile terminals, the computer terminal according to the address information of the computer terminal, and downloading the to-be-downloaded resource from the computer terminal, where the download request includes identity information of the to-be-downloaded resource.

Optionally, the storage medium is further set to store program code for performing the following step: in a case in which the mobile terminal fails to find the address information of the corresponding computer terminal from the directory server, switching to acquire the corresponding to-be-downloaded resource from the data server.

Optionally, in this embodiment, the storage medium may include, but is not limited to: various media that can store program code, such as a USB flash drive, a ROM, a RAM, a removable hard disk, a magnetic disk, and an optical disc.

Optionally, in this embodiment, a processor may perform the following steps according to the program code stored in the storage medium. The steps include: sending a download request to a directory server; receiving, by any one or more mobile terminals, address information, returned by the directory server, of a computer terminal corresponding to the download request; and accessing the computer terminal according to the address information of the computer terminal, and downloading the to-be-downloaded resource from the computer terminal, where the download request includes identity information of the to-be-downloaded resource.

Optionally, in this embodiment, the processor may perform the following step according to the program code stored in the storage medium. The step includes: in a case in which the mobile terminal fails to find the address information of the corresponding computer terminal from the directory server, switching to acquire the corresponding to-be-downloaded resource from the data server.

Optionally, for specific examples in this embodiment, reference may be made to the examples described in Embodiment 1 and Embodiment 2, and a detailed description is not provided herein again in this embodiment.

The sequence numbers of the foregoing embodiments of the present invention are merely for the purpose of description, and do not imply the preference among the embodiments.

When the integrated unit in the foregoing embodiments is implemented in the form of a software functional unit and sold or used as an independent product, the integrated unit may be stored in the computer-readable storage medium. Based on such an understanding, the technical solutions of the present disclosure essentially, or the part contributing to the existing technology, or all or a part of the technical solutions may be implemented in a form of a software product. The computer software product is stored in a storage medium and includes several instructions for instructing one or more computer devices (which may be a personal computer, a server, or a network device) to perform all or a part of the steps of the methods described in the embodiments of the present invention.

In the foregoing embodiments of the present invention, description of each embodiment has its focus. For any part in an embodiment that is not described in detail, reference may be made to a related description in another embodiment.

In the embodiments provided in this application, it should be understood that the disclosed client may be implemented in other manners. The described apparatus embodiment is merely exemplary. For example, the division of units is merely logical functional division, and there may be other division forms in real application. For example, multiple units or components may be combined or be integrated to another system, or some features may be ignored or be not executed. Furthermore, the displayed or discussed mutual couplings or direct couplings or communication connections may be implemented through some interfaces. The indirect couplings or communication connections between the units or modules may be implemented in electrical or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

What is described above is merely preferred implementation manners of the present disclosure. It should be pointed out that a person of ordinary skill in the art may further make some improvements and embellishments without departing from the principle of the present disclosure, and the improvements and embellishments shall also fall within the protection scope of the present disclosure.

What is claimed is:

1. A data processing system based on an asymmetric P2P network, comprising:
    a data server, configured to store a to-be-downloaded resource;

a computer terminal group, comprising at least one computer terminal, the at least one computer terminal communicated with the data server, and being configured to download the to-be-downloaded resource from the data server or another computer terminal in the computer terminal group;

a configuration server configured to store a control parameter that is set to a first control value or a second control value;

a directory server, and a mobile terminal group, comprising a plurality of mobile terminals;

wherein each mobile terminal in the mobile terminal group is configured to:

establish a communication relationship with the data server, the computer terminal, and the configuration server;

download the to-be-downloaded resource from a computer terminal of the computer terminal group if the to-be-downloaded resource is available on the computer terminal;

download the to-be-downloaded resource from the data server if the to-be-downloaded resource is not available on any computer terminal of the computer terminal group;

read the control parameter from the configuration server;

after downloading the to-be-downloaded resource, in response to the control parameter being set to the second control value, upload download information of the mobile terminal to the directory server, the download information of the mobile terminal including address information of the mobile terminal and identity information of the to-be-downloaded resource acquired by the mobile terminal; and after downloading the to-be-downloaded resource, in response to the control parameter being set to the first control value, avoid uploading the download information of the mobile terminal to the directory server.

2. The system according to claim 1, wherein the directory server is configured to: after a first computer terminal in the computer terminal group downloads the to-be-downloaded resource, record download information of the first computer terminal, the download information of the first computer terminal comprising: address information of the first computer terminal and identity information of the to-be-downloaded resource acquired by the first computer terminal.

3. The system according to claim 2, wherein the directory server is further configured to: after receiving a download request sent by any one or more mobile terminals in the mobile terminal group, return address information of a computer terminal corresponding to the download request, wherein any one or more mobile terminals access the computer terminal according to the address information of the computer terminal, and download the to-be-downloaded resource from the computer terminal; and the download request comprises identity information of the to-be-downloaded resource.

4. The system according to claim 3, wherein in a case in which any one or more mobile terminals cannot successfully acquire the address information of the computer terminal corresponding to the download request, any one or more mobile terminals forward the download request to the data server, and download the to-be-downloaded resource from the data server.

5. The system according to claim 2, wherein the directory server is further configured to: after receiving a download request sent by a second computer terminal in the computer terminal group, return, to the second computer terminal, address information of a computer terminal corresponding to the download request, wherein the second computer terminal accesses the computer terminal according to the address information of the computer terminal, and downloads the to-be-downloaded resource from the computer terminal; and the download request comprises identity information of the to-be-downloaded resource.

6. The system according to claim 5, wherein in a case in which the second computer terminal cannot successfully acquire the address information of the computer terminal corresponding to the download request, the second computer terminal forwards the download request to the data server, and downloads the to-be-downloaded resource from the data server.

7. A data processing method based on an asymmetric P2P network, comprising:

establishing, by a computer terminal in a computer terminal group, a communication relationship with a data server configured to store a to-be-downloaded resource, and downloading the to-be-downloaded resource from the data server and/or another computer terminal in the computer terminal group;

downloading, by a mobile terminal in a mobile terminal group comprising a plurality of mobile terminals, the to-be-downloaded resource from the data server and/or the computer terminal in the computer terminal group;

reading, by the mobile terminal in the mobile terminal group, a control parameter that is set to a first control value or a second control value from a configuration server;

uploading, by the mobile terminal in the mobile terminal group, download information of the mobile terminal to a directory server in response to the to-be-downloaded resource having been downloaded to the mobile terminal and the control parameter being set to the second control value, the download information of the mobile terminal including address information of the mobile terminal and identity information of the to-be-downloaded resource acquired by the mobile terminal; and avoiding uploading, by the mobile terminal in the mobile terminal group, the download information of the mobile terminal to the directory server in response to the control parameter being set to the first control value.

8. The method according to claim 7, wherein before the downloading, by any mobile terminal in the mobile terminal group, the to-be-downloaded resource from the data server and/or the computer terminal in the computer terminal group, the method further comprises:

downloading, by a first computer terminal in the computer terminal group, the to-be-downloaded resource; and uploading download information of the first computer terminal to the directory server, wherein the download information of the first computer terminal comprises: address information of the first computer terminal and identity information of the to-be-downloaded resource acquired by the first computer terminal.

9. The method according to claim 8, wherein the step of downloading, by any mobile terminal in a mobile terminal group, the to-be-downloaded resource from the data server and/or the computer terminal in the computer terminal group comprises:

sending, by any one or more mobile terminals in the mobile terminal group, a download request to the directory server;

receiving, by any one or more mobile terminals, address information, returned by the directory server, of a computer terminal corresponding to the download request; and accessing, by any one or more mobile terminals, the computer terminal according to the address information of the computer terminal, and downloading the to-be-downloaded resource from the computer terminal, wherein the download request comprises identity information of the to-be-downloaded resource.

10. The method according to claim 9, wherein after the sending, by any one or more mobile terminals in the mobile terminal group, a download request to the directory server, the method further comprises:

querying, in the directory server, whether the address information of the computer terminal corresponding to the download request sent by any one or more mobile terminals is recorded; and performing, in a case in which the query succeeds, a step of returning, to any one or more mobile terminals, the address information of the computer terminal corresponding to the download request; or forwarding, by the mobile terminal, the download request to the data server in a case in which the query fails, and downloading the to-be-downloaded resource from the data server.

11. The method according to claim 8, wherein after the uploading download information of the first computer terminal to a directory server, the method further comprises:

receiving, by the directory server, a download request sent by a second computer terminal in the computer terminal group;

returning, to the second computer terminal, address information of a computer terminal corresponding to the download request; and accessing, by the second computer terminal, the computer terminal according to the address information of the computer terminal, and downloading the to-be-downloaded resource from the computer terminal, wherein the download request comprises identity information of the to-be-downloaded resource.

12. The method according to claim 11, wherein after the receiving, by the directory server, a download request sent by a second computer terminal in the computer terminal group, the method further comprises:

querying, in the directory server, whether the address information of the computer terminal corresponding to the download request sent by the second computer terminal is recorded; and performing, in a case in which the query succeeds, a step of returning, to the second computer terminal, the address information of the computer terminal corresponding to the download request; or forwarding, by the second computer terminal, the download request to the data server in a case in which the query fails, and downloading the to-be-downloaded resource from the data server.

* * * * *